United States Patent [19]

Tanaka

[11] Patent Number: 5,787,700
[45] Date of Patent: Aug. 4, 1998

[54] SEALED CHAIN

[75] Inventor: Koji Tanaka, Osaka-fu, Japan

[73] Assignee: Tsubakimoto Chain Co., Osaka, Japan

[21] Appl. No.: 865,768

[22] Filed: May 30, 1997

[30] Foreign Application Priority Data

Jun. 3, 1996 [JP] Japan ............................ 8-140133

[51] Int. Cl.⁶ ...................... F16G 13/02; F16G 13/06
[52] U.S. Cl. ..................... 59/5; 474/207; 59/8; 59/78
[58] Field of Search ...................... 59/4, 5, 8, 78; 474/207

[56] References Cited

U.S. PATENT DOCUMENTS

| | | | |
|---|---|---|---|
| 4,795,408 | 1/1989 | Kotegawa et al. | 59/4 |
| 5,459,993 | 10/1995 | Kuriyama et al. | 59/4 |
| 5,468,376 | 11/1995 | Bates | 59/4 |

FOREIGN PATENT DOCUMENTS

| | | | |
|---|---|---|---|
| 55-34353 | 8/1980 | Japan. | |
| 0057939 | 4/1982 | Japan | 59/4 |
| 57-57245 | 12/1982 | Japan. | |
| 0238734 | 9/1989 | Japan | 59/4 |

*Primary Examiner*—David Jones
*Attorney, Agent, or Firm*—Armstrong, Westerman, Hattori, McLeland & Naughton

[57] ABSTRACT

A sealed chain is provided that traps lubricant and dust electrostatically. The chain includes an inner plate which is penetrated by a bushing and an outer plate which is penetrated by a pin. The inner and outer plates are connected alternatingly. Between the inner plate and the outer plate, a seal which is coaxial with the bushing and the pin, is provided in contact with the inner and outer plates. The contact area between the seal and the inner plate is smaller than the contact area between the seal and the outer plate. An annular dust hole, which is around the end of the bushing for sliding on the pin is formed on the inner part of the surface of the seal facing the inner plate. When chain bends due to, for example, winding by a sprocket, the seal slides on the inner plate thus, generating electrostatic charge. The end of the bushing 12, which slides on the pin, is encircled by the dust hole, which entraps lubricant electrostatically on sliding surfaces and dust formed by the wear of sliding surfaces.

1 Claim, 3 Drawing Sheets

SEALED CHAIN

FIELD OF THE INVENTION

The present invention relates to a sealed chain located between inner and outer plates to capture lubricant and dust electrostatically.

BACKGROUND OF THE INVENTION

A sealed chain includes inner plates and outer plates connected alternatingly. Each of the inner plates is penetrated by a bushing and each of the outer plates is penetrated by a pin. Seals are provided between each pair of outer and inner plates, as described, for example, in Japanese Utility Model 55-34353. In such a chain, the seals are tightly pressed onto the inner and outer plates and the bushing in order to hold lubricant between the pin and the bushing and also to prevent penetration or generation of dust.

Such tight contact between the seal and the plates results in a greater flexural friction of the chain when bending, which may accelerate wear of the seals, or earlier failure of the seals due to decreased elasticity. It also leads to a greater impact on the chain when the chain is engaged with a sprocket, which may accelerate wear of the bushing or the roller around it.

SUMMARY OF THE INVENTION

Therefore, the present invention solves such problems by providing a sealed chain including inner plates and outer plates connected alternatingly. Each of the inner plates is penetrated by a bushing and each of the outer plates is penetrated by a pin. The sealed chain also is provided with a seal, coaxial with the pin, which is in contact with the inner plate and outer plate, such that the contact area of the seal with either of the outer plate or the inner plate is smaller than the contact area with the other. The sealed chain also includes an annular dust hole around the pin and the bushing which is formed in the face of the seal having the smaller contact area with either the inner or outer plate.

When a chain bends, the friction of the seal with the outer and inner plates generates electrostatic charge. The charged seal traps lubricant and dust in the dust hole.

The friction chiefly occurs on the side of the seal having the smaller contact area with either the inner or outer plate. The dust hole is around the end of the bushing which slides on the pin and is formed on the same side. Thus, the lubricant and dust in the dust hole are surely trapped in the hole electrostatically.

BRIEF DESCRIPTION OF THE DRAWING FIGURES

DETAILED DESCRIPTION OF THE INVENTION

Figure 1:
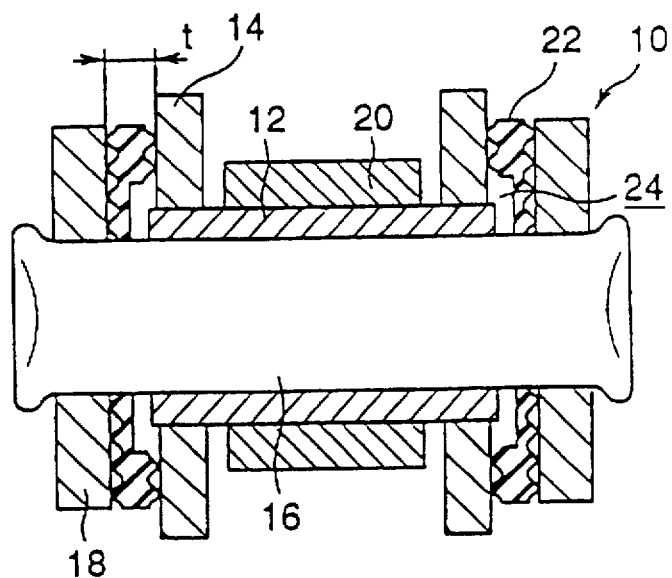
FIG. 1 is a cross-sectional view of a sealed chain according to a first embodiment of the present invention.

Some embodiments of the invention are now described with reference to the drawing figures. FIG. 1 shows a first embodiment of the invention in which the chain 10 includes an inner plate 14 penetrated by a bushing 12 and an outer plate 18 penetrated by a pin 16. The inner plate 14 and the outer plate 18 are connected alternatingly. A roller 20, which is in rolling contact with a sprocket, is fitted so that it can rotate around the bushing 12.

Between inner plate 14 and outer plate 18, a seal 22, which is coaxial with the bushing 12 and pin 16, is provided in contact with the inner and outer plates 14, 18. The maximum thickness of the seal 22 is substantially equal to, or slightly greater than, the gap t between the outer and inner plates. The contact of the seal 22 with plates 14, 18, as stated above, is loose enough to reduce friction between the seal 22 and the inner and outer plates 14, 18 when the chain bends. The contact area between seal 22 and inner plate 14 is smaller than the contact area between seal 22 and outer plate 18. An annular dust hole 24, around the end of the bushing which slides on the pin, is formed on the inner part of the surface of the seal 22 facing the inner plate. Seal 22 also is in contact with pin 16 for limiting the movement of the pin 16 in the radial direction.

In this embodiment, when chain 10 bends due to, for example, winding by a sprocket, seal 22 rotates so as to accompany outer plate 18 with which the seal 22 has a larger contact area. Seal 22 slides, therefore, primarily on inner plate 14, although seal 22 also slides on outer plate 18, thereby generating electrostatic charge. Seal 22 may be inserted into pin 16 to ensure that the seal 22 slides on inner plate 14.

Friction between the seal 22 and the inner plate 14 generates static electricity, which charges the contact surface, and exerts influence on the seal surface in and around the dust hole. The end of the bushing 12, which slides on pin 16, is encircled by the dust hole, and the dust hole electrostatically entraps lubricant on the sliding surfaces and the dust formed by the wear of the sliding surfaces.

In addition, both contact surfaces of the seal 22 with the plates 14, 18 in the present embodiment have annular grooves, which impede centrifugal flow of lubricant to reduce leakage of the lubricant. The grooves also enlarge the surface area of the seal 22, leading to higher electrostatic charge for more efficient entrapment of lubricant and dust.

Figure 2:
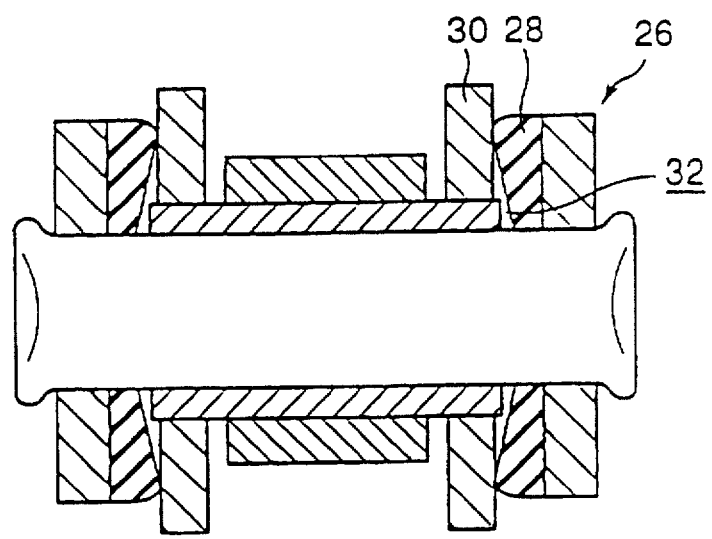
FIG. 2 is a cross-sectional view of a sealed chain according to a second embodiment of the present invention.

FIG. 2 shows a second embodiment of the invention, in which chain 26 has a dust hole 32 formed by the tapered face of seal 28 towards inner plate 30.

Figure 3:
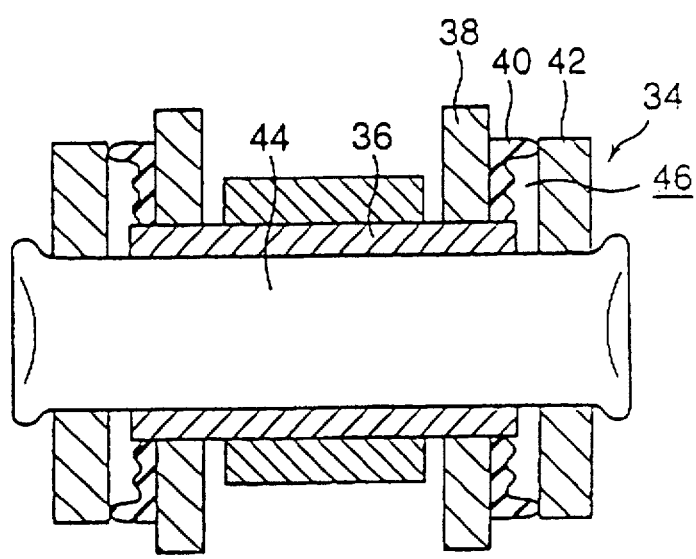
FIG. 3 is a cross-sectional view of a sealed chain according to a third embodiment of the present invention.

FIG. 3 presents sealed chain 34 according to a third embodiment of the invention, in which the bushing 36 protrudes out of the inner plate 38 and the seal 40 is in contact with the inner plate 38, the outer plate 42 and the bushing 36. The contact area of the seal 40 with outer plate 42 is smaller than the contact area with inner plate 38. A dust hole 46 is formed around the end of the bushing 36, which slides on pin 44, in the inner part of the surface of seal 40 towards the outer plate.

Electrostatic charge appears on the contact surface between the seal 40 and the outer plate 42, beside which the dust hole 46 is located, to capture lubricant and dust. As in the first embodiment, the seal 40 may be inserted into the bushing 36 to ensure sliding of the seal 40 on outer plate 42.

The surface of seal 40, which forms the bottom of the dust hole 46, is rendered uneven, resulting in an increased electrostatic charge for more efficient entrapment of lubricant and dust.

According to the invention, lubricant and dust are trapped in a dust hole electrostatically by virtue of electrostatic charge formed by friction of a seal with either the outer plate or inner plate having the smaller contact area with the seal. Therefore, the contact between the seal and the outer or inner plate need not be so tight as in conventional design where the seal is used for physical containment of lubricant and dust. Consequently, the seal experiences reduced wear and maintains elasticity for a longer period of time, leading to a significantly longer lifetime of the chain because damages of the seal due to repeated bending of the chain is prevented.

In addition, the design according to the present invention permits reduction of friction in the chain when bending, while maintaining lubricant retention and dust containment features, thus rendering winding of the chain by the sprocket smoother, reducing wear of the bushing and roller, and reducing impact noise of the chain and sprocket.

I claim:

1. A sealed chain comprising:

a hollow cylindrical bushing;

a pin housed within said bushing;

first and second inner plates and first and second outer plates connected alternatingly to form said chain, wherein each of said inner plates is penetrated by said bushing and each of said outer plates is penetrated by said pin;

a seal which is coaxial with said pin and said bushing and which is loosely fitted around any one of said pin and said bushing so as to be slidable with respect to said first and second inner plates and said first and second outer plates and to be in contact with any one of said pin and said bushing, with each of said first and second inner plates and with each of said first and second outer plates, wherein said seal and each of said first and second inner plates form first and second seal-inner plate contact areas, respectively, and said seal and each of said first and second outer plates form first and second seal-outer plate contact areas, respectively, such that either said first and second seal-inner plate contact areas are larger than said first and second seal-outer plate contact areas or said first and second seal-inner plate contact areas are smaller than said seal-outer plate contact areas in order to generate large electrostatic charge when said seal slides on said first and second inner plate; and an annular dust hole around said pin and said bushing, wherein said one of said first and second seal-inner contact plate areas and said first and second seal-outer plate contact areas surrounds said annular dust hole so that said dust hole electrostatically entraps lubricant and dust.

\* \* \* \* \*